United States Patent
Jensen

(10) Patent No.: US 7,187,718 B2
(45) Date of Patent: Mar. 6, 2007

(54) SYSTEM AND METHOD FOR ENCODING AND DECODING DIGITAL DATA USING ACOUSTICAL TONES

(75) Inventor: James Robert Jensen, Columbia, MD (US)

(73) Assignee: Disney Enterprises, Inc., Burbank, CA (US)

( * ) Notice: Subject to any disclaimer, the term of this patent is extended or adjusted under 35 U.S.C. 154(b) by 614 days.

(21) Appl. No.: 10/695,168

(22) Filed: Oct. 27, 2003

(65) Prior Publication Data

US 2005/0100117 A1    May 12, 2005

(51) Int. Cl.
*H04K 1/10* (2006.01)
*H04M 9/00* (2006.01)

(52) U.S. Cl. .................................. 375/260; 379/388.01
(58) Field of Classification Search ................ 375/260, 375/271, 295, 302, 316, 322; 367/81, 117, 367/135, 137, 138; 370/210; 379/388.01
See application file for complete search history.

(56) References Cited

U.S. PATENT DOCUMENTS

| | | | |
|---|---|---|---|
| 4,063,031 A | 12/1977 | Grunza ......................... 179/1 |
| 5,110,189 A | 5/1992 | Haines ......................... 299/30 |
| 5,249,220 A | 9/1993 | Moskowitz et al. .......... 379/93 |
| 5,732,133 A | 3/1998 | Mark .......................... 379/355 |
| 5,825,871 A * | 10/1998 | Mark ..................... 379/357.03 |
| 5,924,499 A | 7/1999 | Birchak et al. ................ 175/40 |
| 5,959,547 A | 9/1999 | Tubel et al. ............. 340/853.2 |
| 6,023,779 A * | 2/2000 | Fullam et al. ............... 714/751 |
| 6,236,724 B1 | 5/2001 | Labaton et al. ............. 379/355 |
| 2003/0196539 A1* | 10/2003 | Koseki et al. ................ 84/604 |
| 2004/0081078 A1* | 4/2004 | McKnight et al. .......... 370/210 |

* cited by examiner

Primary Examiner—Don N. Vo
(74) Attorney, Agent, or Firm—Greenberg Traurig, LLP; John R. Wahl

(57) ABSTRACT

A system and a method for the transmission and reception of digital data wirelessly using acoustic tones comprises an encoder, a data interleaving system, an error correction system, and a decoder. The digital data is decoded by using in-phase and quadrature filters and through a score based function that determines the data that was most likely transmitted.

46 Claims, 9 Drawing Sheets

SYSTEM AND METHOD FOR ENCODING AND DECODING DIGITAL DATA USING ACOUSTICAL TONES

BACKGROUND OF THE INVENTION

1. Field of the Invention

The present invention relates to communication devices for communicating signals wirelessly.

Especially, the present invention relates to a system and method for transmitting digital data between communicating devices using acoustic tones as information carriers for the digital data.

2. General Background

One of the most difficult challenges faced by providers of low cost wireless computer peripheral devices is the need to distribute custom interface hardware so that the peripheral device can communicate with the computer. The interface hardware not only adds cost to the product, but for many products such as low cost toys, the sales and distribution channels are not prepared to support the distribution of these additional computer devices.

As a result, a mechanism is required whereby devices can communicate with a personal computer, or with each other, using standard hardware (e.g., digital signal processing chips, analog to digital converters, etc.). In addition, the devices employing this communication mechanism should be flexibly designed to operate in conditions where line-of-sight communication between said devices is not present.

There are many techniques that encode and transmit data using amplitude, frequency or phase modulations for subsequent detection in a receiver. These techniques as a class are fundamentally different in that they do not use acoustic pressure waves as the communications mechanism.

SUMMARY OF THE INVENTION

Clearly, there is a need for using sound or acoustic tones as carriers of digital data in simple and low cost devices. Specifically, the present invention of using acoustic tones as carriers of digital data arose from the need to transmit low bandwidth data between a peripheral device and a computer (or another device) using existing sound recording and playback means such as audio speakers and microphones, respectively.

The system and method of the present invention allows for the transmission (and reception) of digital data wirelessly using sound. Specifically, this technique encodes (or modulates) acoustic sound tones (in the frequency range of 20 Hz to 20 kHz) with digital data bits. The modulation scheme could be amplitude, frequency, or phase, or any combination thereof. Because of the nature of the modulation, humans may be unable to discern a difference in the sound of the transmission for different data patterns. At the receiver, demodulation/detection is done so that the digital data is extracted from the acoustic tones. The use of this technique can be extended such that the tonal "content" for a variety of applications can be developed where such tonal content is not adversely affected by the presence of external noise. From a hardware perspective, the communication between devices is enabled by means of digital signal processors (DSPs) that have embedded algorithms to perform modulation and demodulation, analog-digital converters, audio speakers, etc.

Accordingly, in one embodiment of the present invention, the digital data transmitting system using acoustic tones comprises: (i) a generator for generating digital data bits, wherein the digital data bits include at least one check bit; (ii) an error correction and interleaving system for adding at least one error correction bit to the digital data bits to form a data sequence; (iii) an encoder for encoding each bit in the data sequence with a signal having the at least one acoustic tone to form an encoded sequence, the frequency of the at least one tone lying between 20 Hz and 20 kHz; and (iv) an audio speaker for transmitting the encoded sequence. The digital data transmitting system may further include a modulator having a carrier signal as one input, wherein the carrier signal is modulated by the encoded sequence. The number of digital data bits may be the same as the number of error correction bits, and the number of digital data bits could be an integer multiple of P (e.g., P=3). Each bit in the data sequence is encoded with a signal having two frequencies, wherein the signal comprises a tone of a first frequency, followed by a first silence period, followed by a tone of a second frequency, and followed by a second silence period. For example, the first frequency could be about 1600 Hz and the second frequency may be about 2800 Hz when the bit is a 0; and, the first frequency could be about 2800 Hz and the second frequency may be about 1600 Hz when the bit is a 1. The first and the second silence period may be about 20 ms in duration.

In another embodiment of the present invention, a receiver for detecting digital data in an acoustic tone based signal comprises: (i) a first set and a second set of filters for filtering the received acoustic tone based signal, wherein each set of filters include an in-phase filter and a quadrature filter; (ii) a first and a second detector for determining the magnitude of the complex domain output from the first and the second set of filters respectively; (iii) a difference operator for generating a difference between outputs from the first and the second detector; (iv) means for detecting a digital word obtained from a bit detector, wherein the input to the bit detector is the difference between the outputs of the first and the second detectors; (v) a buffer for storing the detected digital word; (vi) means for error correcting the stored digital word for determining the digital data. Additionally, the receiver further includes first and second p-bit delay operators (e.g., p=½), the first p-bit delay operator delaying the output from the first detector and the second p-bit delay operator delaying the output from the second detector. The receiver further includes a first and a second difference means, wherein the first difference means determines the difference between the output of the first detector and an output of the first p-bit delay operator; and, the second difference means determines the difference between the output of the second detector and an output of the second p-bit delay operator. In addition, the receiver includes means for determining a score as a function of previous values of the difference between the outputs of the first and the second detectors, and wherein the stored digital word is selected for error correction if the score for said stored digital word exceeds a threshold. As an example, the score may be a sum of the previous values of the difference between the outputs of the first and the second detectors, and there could be means for dynamically adjusting the threshold as a function of an unselected digital word.

BRIEF DESCRIPTION OF THE DRAWINGS

In order that the manner in which the above-recited advantages and objects of the invention are attained, as well as others which will become apparent, more particular description of the invention briefly summarized above may be had by reference to the specific embodiments thereof that are illustrated in the appended drawings. It is to be understood, however, that the appended drawings illustrate only typical embodiments of the invention and are therefore not to be considered limiting of its scope, for the invention may admit to other equally effective embodiments.

In the drawings.

DETAILED DESCRIPTION OF THE INVENTION

Figure 1:
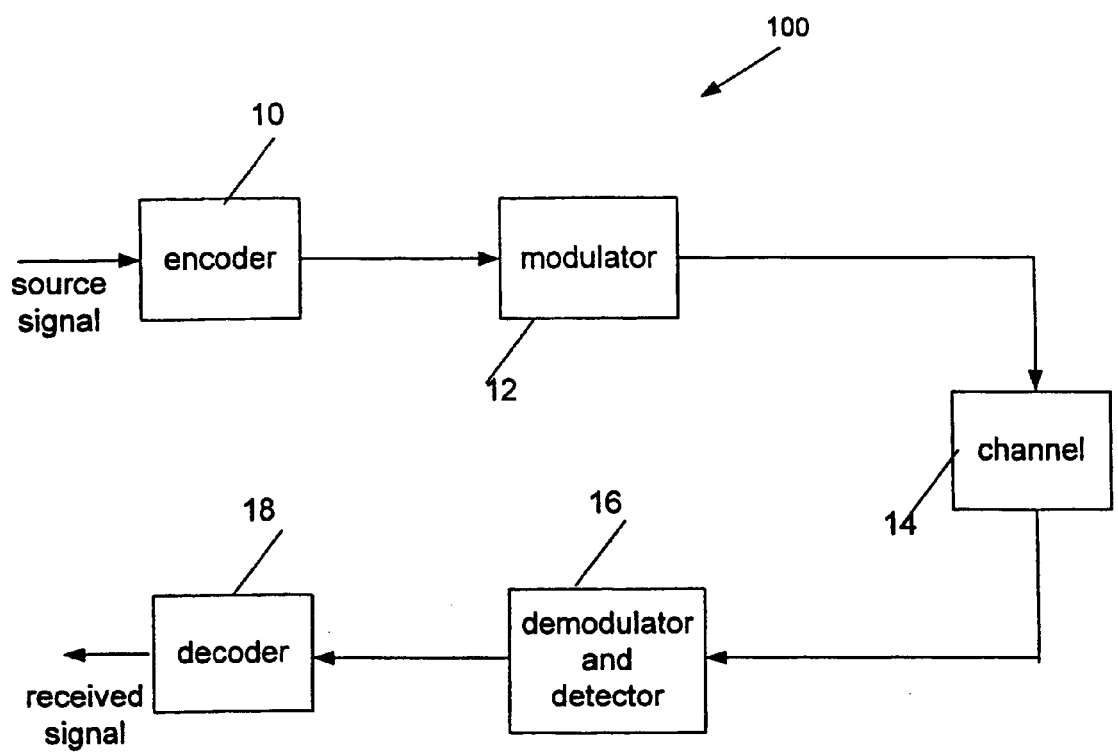
FIG. 1 is a block diagram of the communication system for using acoustic tones for wireless communication.

Referring now in detail and by reference characters to the drawings (FIGS. 1–9), which illustrate several different embodiments of the present invention, therein shown is a system and method for transmitting and receiving acoustic tones for wireless communications. Such a system, as in the present invention, employs circuits that enable transmission of low bandwidth data between multiple devices (or a computer) using the device's hardware (e.g., sound card, microphone, audio speaker, DSP chips, analog-digital converters, etc.). The communication environment could be a living room, an automobile cabin, a telephone channel, a non-confined environment (e.g., a playground), theater, etc.

A computer or a device may include an algorithm to reliably receive and decode digital data, sent by a similar device, embedded in an audio signal (from at least one audio speaker) in the average living room channel, media room or den, anywhere within a reasonable distance, such as between 2 ft to 30 ft of the audio speaker, and within a volume of space subtended by pi radians in front of the audio speaker. The algorithm is designed so that the signal reception is independent of the audio speaker system and room characteristics (e.g., reverberation time), and it is reliable in the presence of noise when the audio is at normal listening levels. Furthermore, the algorithm is designed so that signal reception at the receiver is independent of the location of the receiver inside the specified distance from the sound source (i.e., the audio speaker).

The source signal (which is an acoustical signal) as shown in FIG. 1 could be an audio based signal (frequency range of 20 Hz–20 kHz), an infrasonic signal (below the threshold of hearing), or an ultrasonic signal (above 20 kHz). For example, the audio signal could be at least one of an acoustic tone, a music signal, a speech signal, or any combination thereof. Digital data could be encoded by the encoder 10 into this tone(s), via the encoding scheme of the present invention, and the received signal could be decoded by decoding scheme 18 according to the present invention.

The present system encodes each bit (based on its value) in the digital data using acoustical tones. The encoded sequence or digitized data, at the output of the encoder 10, may additionally be mapped using the modulator system 12 onto a carrier signal. This modulation could involve amplitude, frequency, or phase modulation. Because of the nature of the modulation, humans may be unable to discern a difference in the sound of the transmission for different data patterns. The use of this system can be extended so that sound "content" for a variety of applications can be developed where the content is not adversely affected by the presence of the data. For the aforementioned scenario, the system can achieve a bit rate of about 12 bps (40 symbols per second, using redundancy and coding) so the tone would be about a couple of seconds long. The encoded or message signal at the output of the encoder 10 is a digital signal. Depending on the nature of the encoder, the digital signal may be of a predetermined length.

It is important that the communication of digital data between the transmitting device and the receiver be reliable. Specifically, under best-case conditions, no more than 1 misread or undetected data segments out of 10,000 broadcast data segments should be allowed. Under the worst-case conditions, no more than 1 misread or undetected data segment out of 1000 broadcast data segments are permitted.

Furthermore, the communication algorithm, according to the present invention, should be robust under the presence of noise in different environments. Noise can be characterized as continuous or impulsive, and broadband or fixed-frequency (narrow band). Noise can also be classified by annoyance factors: voices and music may be deemed more annoying than random noise, as are hammering (impulsive) or continuous tones (narrow band). As a reference, once a noise level exceeds 67 dBA, it begins to interfere with communication between people 3 ft. apart. Further details on noise and its effects in different environments will be presented below.

It is also important to maintain a certain data rate for communication between the device and the receiver. While a minimum data rate of 24 bits/sec should be achieved, a more important measure is the duration of the data. Transmission of 16-bit data at 24 bits/sec takes two thirds of a second, but this does not take into account the bits that may be required for synchronization and/or data correction schemes. Thus, in one aspect of the present invention, a complete data pulse is no longer than 1 second in duration.

The device can communicate with the receiver (having a decoding algorithm) in a variety of environments, and at various signal to noise ratios, including:

Living Room:

The algorithm is able to reliably receive and decode digital data embedded in an audio signal (e.g., DTMF tones) in the average living room, media room or den, anywhere within approximately 2 ft to 20 ft of the device, and within a volume of space subtended by pi radians in front of the audio speaker in the device. The algorithm is designed so that the signal reception is substantially independent of the audio speaker and room acoustical characteristics. Also, the algorithm is designed to communicate reliably in the presence of noise when the audio signal is at normal listening levels. Furthermore, the algorithm is designed so that the signal reception is independent of the location of the receiver.

Regarding noise, the typical interior residential noise level is 30 to 40 dBa, 50 to 55 dBa with voices. Possible ambient noise sources include voices, music, barking dogs and other household sounds. Both impulsive and continuous noise sources can be expected. A reasonable upper limit for background noise level is 60 dBa. Accordingly, the algorithm in the receiver is designed to accommodate a signal to noise ratio ranging between +27 dB and −3 dB.

Automobile:

The algorithm (in a receiver) is able to reliably receive and decode data sent embedded in an audio signal (e.g., DTMF tones) in the average automobile. The algorithm is designed so that the signal reception is substantially independent of the audio speaker and automobile cabin interior characteristics, and the algorithm operates reliably in the presence of noise when the audio signal is at normal listening levels. Also, the signal reception is independent of the location of the device inside the vehicle.

While very dependent on vehicle type, the range of the normal listening level for the audio signal, such as one coming from a speaker, in an automobile is typically 65 dBA (at low speeds) to 78 dBA (at high speeds). A reasonable lower limit is 60 dBA.

Regarding noise, it can vary considerably with the velocity of the car. Engine and drive train noise is typically low frequency (<100 Hz), while aero-acoustic and tire noise is middle frequency and increases with increasing velocity. Also, there are air conditioning and air sounds from open windows. Other than the occasional horn blast and crash, most interior vehicle noise is generally continuous.

Typical interior vehicle noise levels (for test vehicles such as Honda Accord and CRV):

Stopped, in traffic 53 dBA 70 mph, constant 66 dBA to 70 dBA

Accelerating with window partially open 86 dBA

The audio signal level may be set at 3 to 10 dB over the ambient noise. Accordingly, the algorithm is designed to accommodate a signal to noise ratio ranging between +12 dB to −10 dB.

Desktop Environment:

The algorithm, which is in a receiver associated with a computer, is able to reliably receive and decode data sent via a device having at least one audio speaker in the average bedroom, office or den, anywhere within an average distance from the audio speaker. The algorithm is designed so that the signal reception is substantially independent of the speaker and room characteristics. Also, the algorithm operates with reliability in the presence of noise when the audio signal (e.g., DTMF tones) is at normal listening levels. Additionally, the algorithm is designed so that the signal reception is independent of the location of the receiver inside the specified distance from the audio speaker.

The range of normal listening level for PC audio at a distance of 4 ft from the speakers is 55 to 65 dBA. A reasonable lower limit is 55 dBA. In the home environment, noise levels are expected to be of the order of the levels found in the living room environment. In an office environment, typical background noise levels are about 45 to 55 dBA, including fan noise, or 55 to 65 dBA when a person is listening to music on his or her computer. Nearby activity and conversation can raise this to anywhere from 65 to 80 dBA. A reasonable worst case for background noise in an office is 75 dBA. Accordingly, the algorithm is designed to accommodate a signal to noise ratio ranging between +10 dB to −10 dB.

Telephone Channel:

The algorithm is able to reliably receive and decode data sent via a telephone audio signal (e.g., DTMF tones) within about 2 in. of the telephone headset or hands-free speaker.

A telephone dial tone at this distance ranges from 48 dBA to 55 dBA, with 52 dBA being typical, and 48 dBA being a reasonable lower limit.

Expected background noise is similar to the home and office scenarios above, and are therefore expected to be 50 to 65 dBA, with 65 dBA being a reasonable upper limit. Accordingly, the algorithm is designed to accommodate a signal to noise ratio ranging between +5 dB to −17 dB.

Open Environment (e.g. Playground):

The algorithm in the receiver is able to reliably receive and decode digital data sent by a device in relatively close proximity, or within 2 to 4 in, in a variety of environments, including outdoors (of course, the algorithm may be appropriately modified if this distance changes). This scenario is unique as lower reliability is acceptable, since to a certain extent users will re-transmit the digital data until successful reception. Typical noise levels in an outdoor urban environment are both impulsive and continuous and are in the range of 45 to 65 dBA, with peaks of up to 70 dBA, depending on proximity to traffic and commercial noise sources. As an example, children's shouting in a playground can exceed 90 dBA. Accordingly, the algorithm is designed to accommodate a range of signal to noise ratios.

Figure 2:
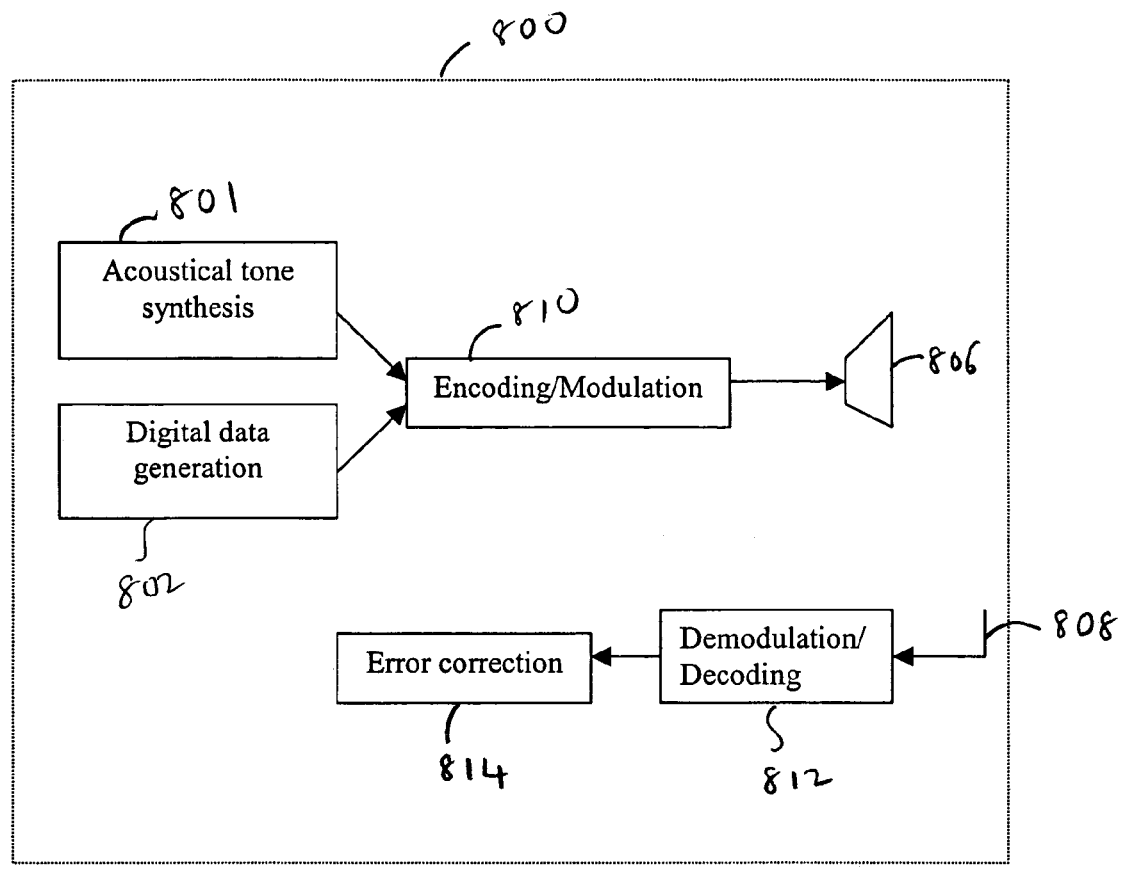
FIG. 2 is a block diagram of a device/system that uses acoustic tones for communication.

An example of a device is depicted in FIG. 2. Specifically, shown therein is a block diagram of a digital device including a transmitter portion and a receiver portion operating with acoustical sound tones. The device 800 for transmitting and receiving digital data includes (i) a sound synthesis means (e.g., a sound card or the controller chip 801 that outputs the acoustical tone signals); (ii) a digital data generation means 802 that outputs the digital stream, (iii) a sound/data receiving means (e.g., a microphone 808); (iv) a sound/data transmission means (e.g., the audio speaker 806); (v) a processing means for encoding 810 and decoding 812 digital data according to the present invention; (vi) analog-digital and digital-analog converters; and (vii) error correction means 814. Accordingly, the device 800 is capable of communicating with another similar device having acoustical tones transmitting and/or receiving means.

Described below are the various systems of the present invention:

1. Error Correction and Interleaving System in the Transmitter:

The data to be transmitted consists of M bits. At least one additional bit could be added to these M bits. The additional bit is the complement of the least significant bit (LSB) in the input data, resulting in M+1 bits. This design provides at least one check bit and ensures that there is at least one bit transition in each message. This is useful in the scoring of candidate messages in the detection code (explained later in the detection process). The M+1 bits are padded with zeros, if necessary to the next highest multiple of an integer P (e.g., P=3 in one aspect of the invention). The bits are taken in groups of P for generating an equal number of error correction bits (suitable modifications to the encoding process may be done in the case when the number of error correction bits is not be the same as the number of data bits), and the digital data bits and the error correction bits are combined to form a digital data sequence. The correction bits are defined by values in the following table.

| data bits | correction bits |
|---|---|
| 000 | 000 |
| 001 | 011 |

| data bits | correction bits |
|-----------|-----------------|
| 010 | 101 |
| 011 | 110 |
| 100 | 011 |
| 101 | 101 |
| 110 | 110 |
| 111 | 000 |

Every line of the above table differs from every other line of the table by at least 3 bits. Thus, according to the present error correcting scheme any single bit error can be unambiguously detected, whereas two bit errors can be detected, but not corrected.

For example, if the M+1 bits are "abcdefghi", and from the table we have "abc"->"ABC", "def"->"DEF", and "ghi"->"GHI", then the transmitted message is encoded to form the data sequence as: "adgbehcfiADGBEHCFI". In this way, any 3 consecutive bits can be corrupted and the errors can be corrected (more for longer messages), whereas two errors within the group "abcABC" cannot be corrected. The corruption of consecutive bits was considered more likely than corruption distributed across the message and hence the choice for this design.

Including the error correction bits and the additional bit described above, the entire sequence to be encoded consists of 2(M+1). Recall that the M+1 must be a multiple of 3 and the bit sequence is padded if necessary to make this true.

Figure 3:
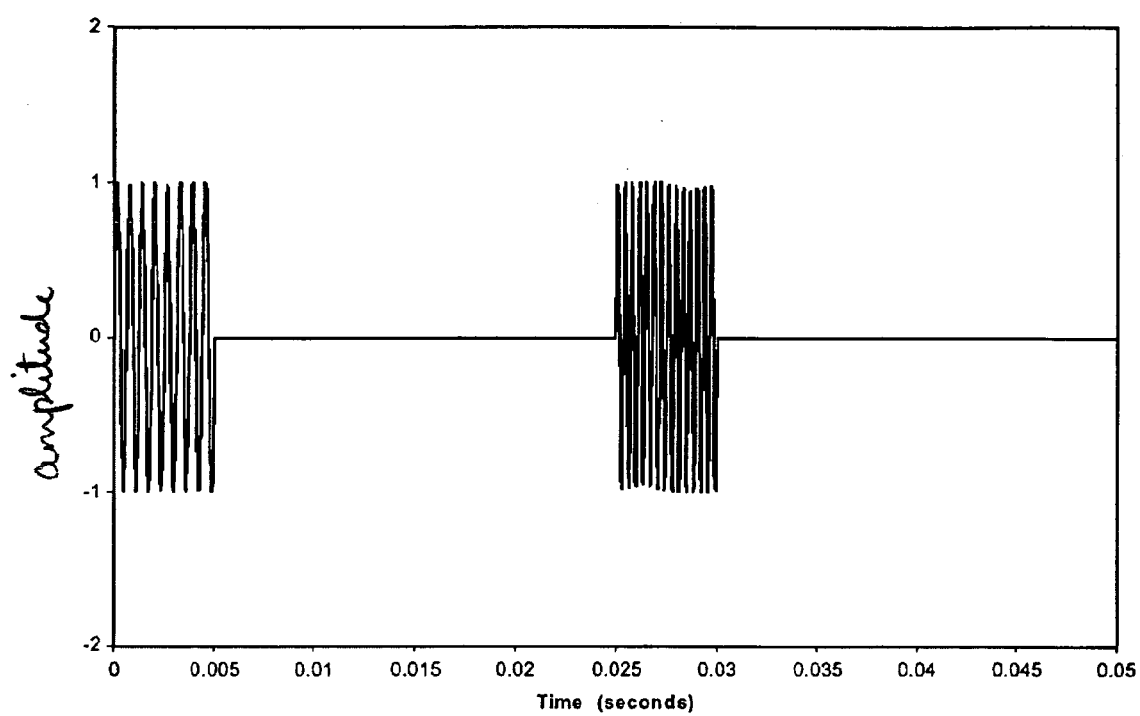
FIG. 3 is an exemplary depiction of the sound encoding for a bit 0 in the digital data.

2. Sound Encoding System in the Transmitter:

For every bit of the 2(M+1) digital data sequence, two sounds (acoustical tones) and two gaps are added to the accumulated total. Thus, if the corresponding bit is 0, then the contribution is as shown in FIG. 3, where the first acoustical tone is of 8 cycles duration for a 1600 Hz signal, and the second acoustical tone is of 14 cycles length for a 2800 Hz signal. Both tones are shown to be of the same length and amplitude, although not necessary for the design. The length of each acoustical sound tone is about 5 ms and is the ratio of the number of cycles and the frequency of the tone. In one aspect of the invention, the frequency of the second tone (i.e., 2800 Hz) is chosen so as to make the length of the two tones equal. The silence gap, following the first tone and the second tone, may be chosen as desired. In one aspect of the invention, the silence gap is chosen equal to the length of the tone multiplies by 4. The encoding of the entire 0 bit takes 50 ms (i.e., 2×(1+4)×8/1600 Hz).

Figure 4:
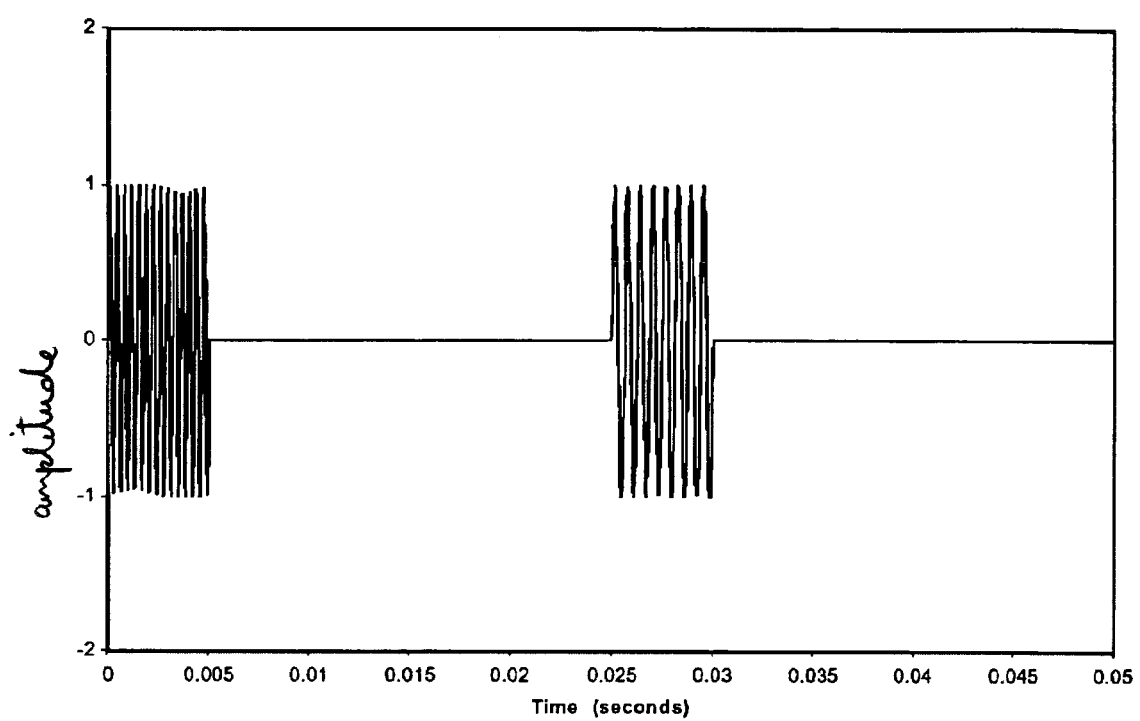
FIG. 4 is an exemplary depiction of the sound encoding for a bit 1 in the digital data.

If the bit is a 1, then the contribution is as shown in FIG. 4, and may be simply the reverse order of the same two sound tones that were used for the 0 bit. The sample rate used to generate the sound tones was 22050 Hz. The total length of the encoded sound is the product of the lengths used to encode each bit (50 ms) and the total number of bits (18 bits in this example), less the last silence gap (880 ms).

Figure 5:
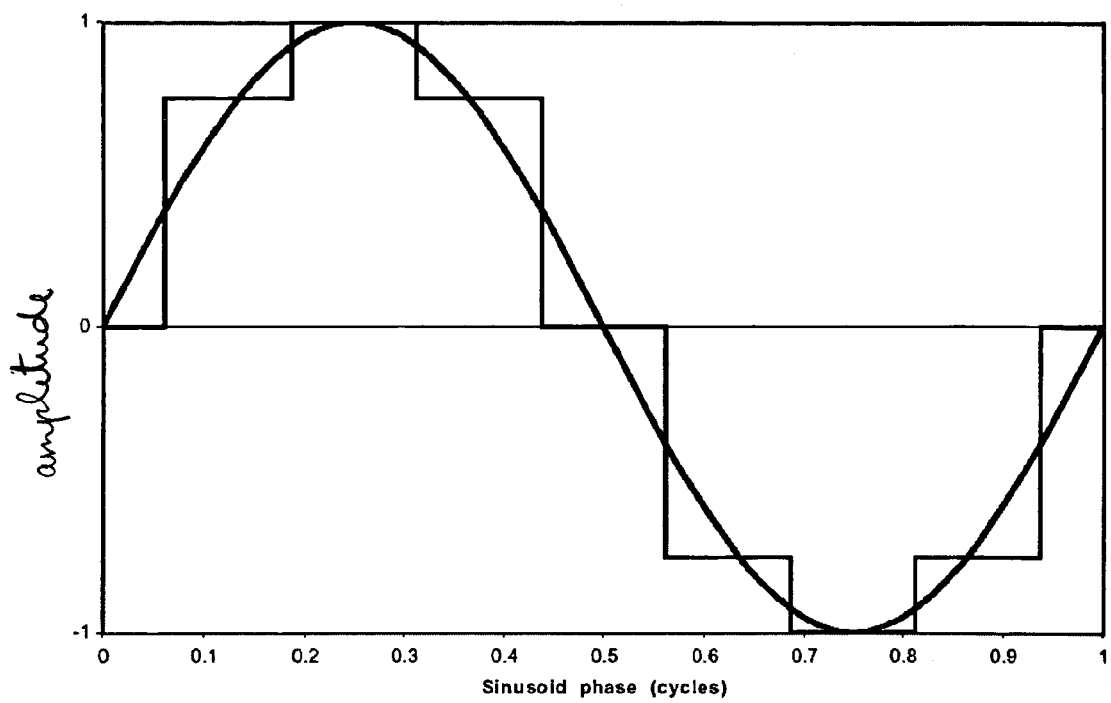
FIG. 5 is an exemplary depiction of the quantization (i.e., discrete weighting) involved for the message detection filters.

3. Message Detection Filters in the Receiver:

Two quadrature filters are used in the message detection; one for each of the two burst frequencies. These are finite impulse response filters that are designed to minimize the numerical loading of the processor. Ideally, these filters would compute the quantities $$f_I(n) = \sum_{m=0}^{M-1} x_{n-m}\cos[\omega(n-m)] \text{ and } f_Q(n) = \sum_{m=0}^{M-1} x_{n-m}\sin[\omega(n-m)]$$

where $f_I(n)$ is the in-phase part of the filter, $f_Q(n)$ is the quadrature part of the filter, $x_n$ is the nth sound sample, and $\omega$ is the frequency (radians per sample) that the filter is designed for. In order to simplify the implementation of these filters, the transcendental functions are replaced by the set (or quantized) of values 0, ±¾, and ±1, as shown in FIG. 5.

Figure 6:
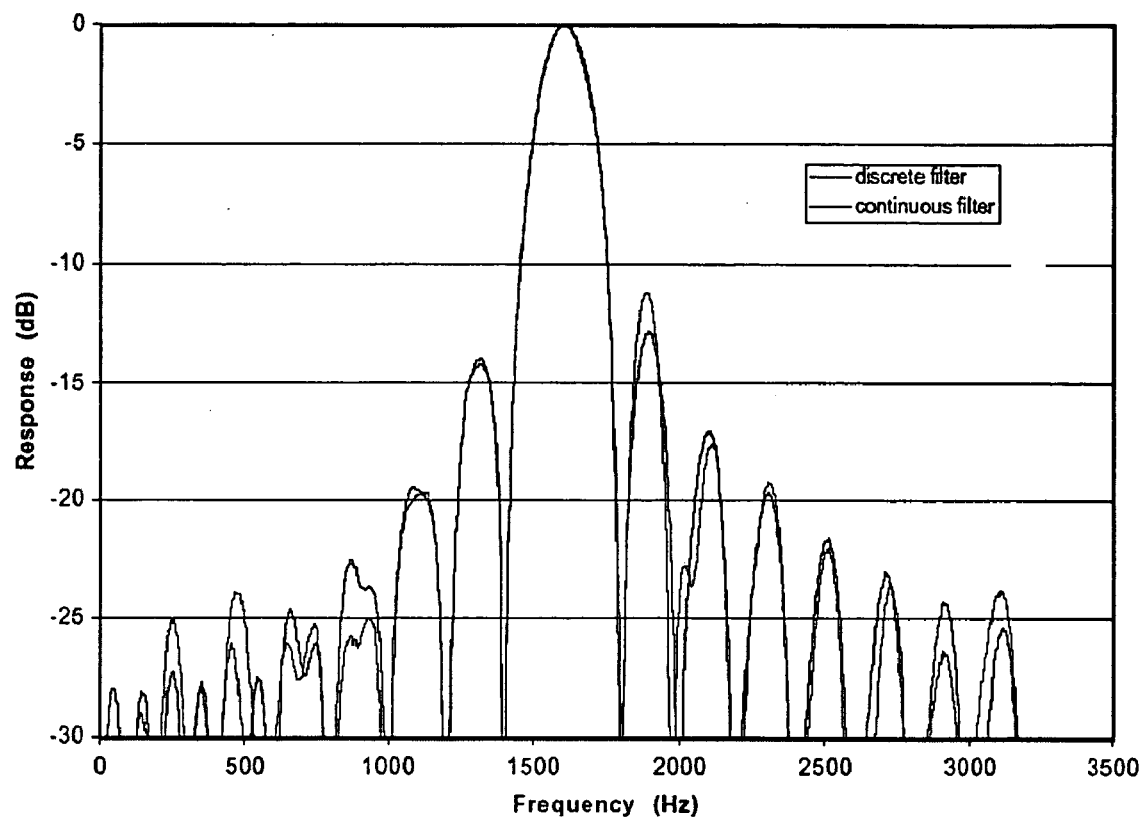
FIG. 6 is a comparison in magnitude spectra between the discrete weighted filters and their continuous time counterparts.

This type of weighting or quantization is very easy to implement and can be done with simple additions, subtractions, and bit shifts. The frequency or magnitude response of the ideal and approximated filters is as shown in FIG. 6. It can be seen that the filter response is little affected by the use 5 discrete values in place of the continuous sine and cosine functions for a 1600 Hz filter, with a sample rate of 22050 Hz. The width of the filter response (position of the first null) is the inverse of the burst length (5 ms) and is 200 Hz.

Figure 7:
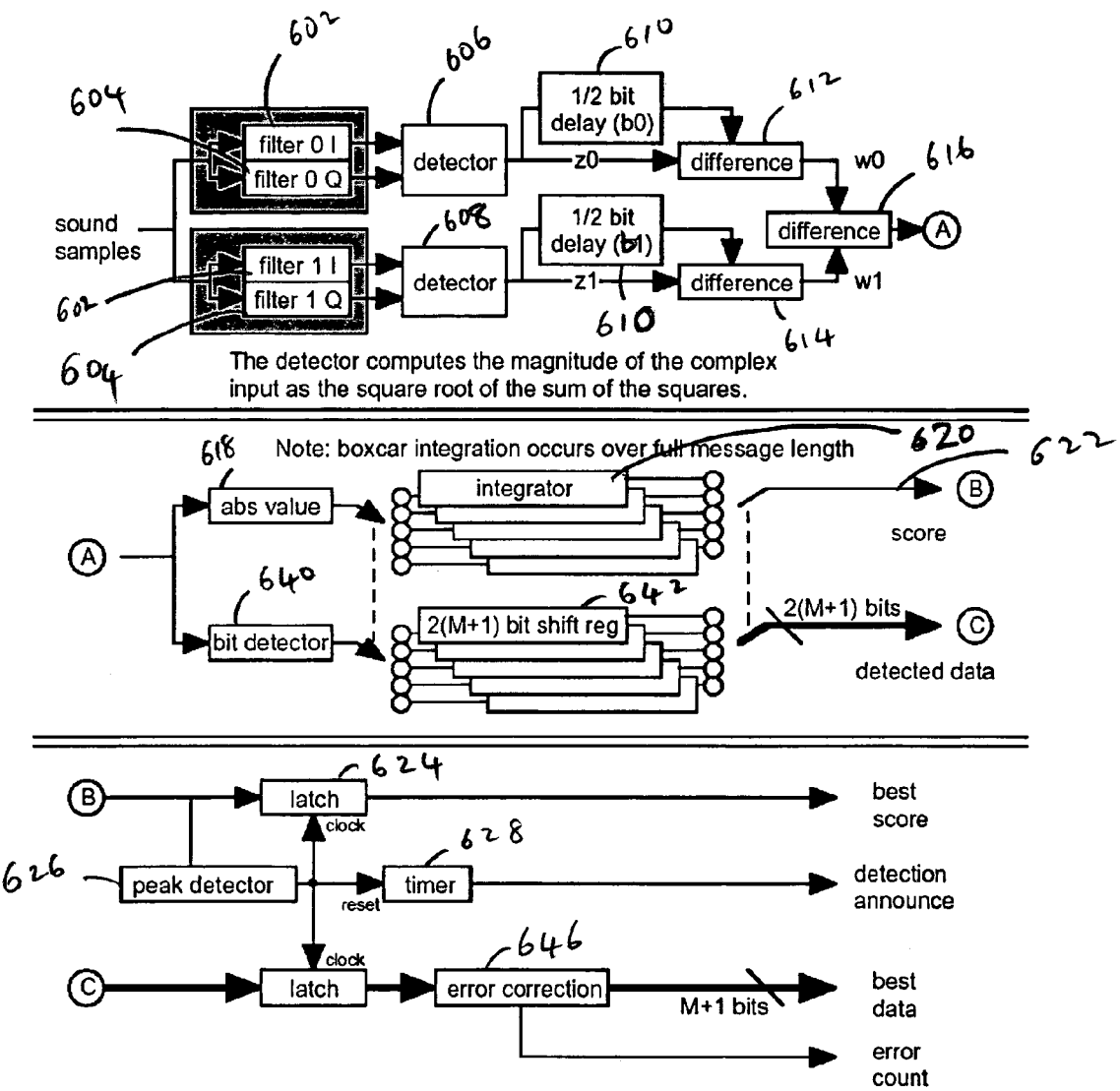
FIG. 7 shows a depiction of one embodiment of the digital data detection process according to the present invention.
Figure 8:
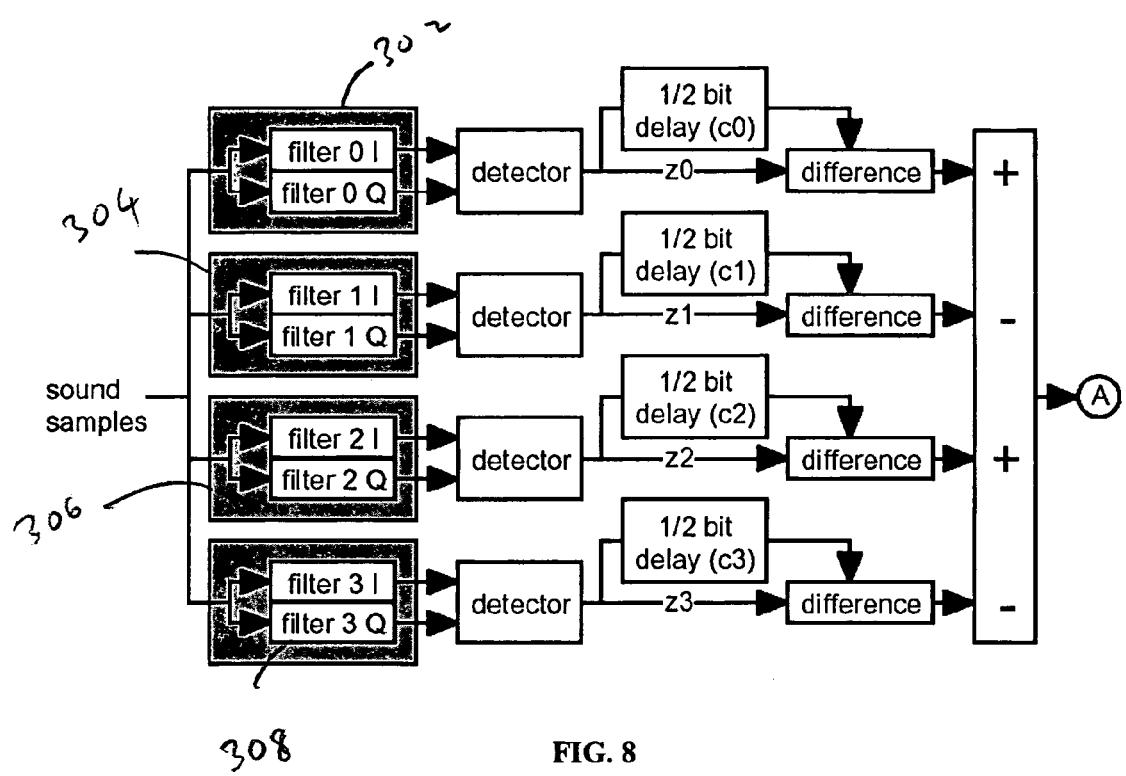
FIG. 8 shows a depiction of another embodiment of a module involved in the digital data detection process according to the present invention.

4. Data Detection System in the Receiver:

The data detection system 600 is diagrammed in FIG. 7. The received acoustic tone based signal samples are fed to the in-phase and quadrature message detection filters 602 and 604 (for each bit 0 and 1) at a sample rate (e.g., 22050 Hz), which is determined by the sound input hardware. The processing rate is a function of the tone length (5 ms) and a quantity that determines the number of processing intervals within the burst length. For the example parameters being described, this rate is 800 Hz (⅘ ms). At this rate, the following steps are performed by the algorithm according to the present invention:

(i) The in-phase (I) and quadrature (Q) values are recovered from the two filters 602 and 604 and the magnitude of each filter output is computed. These magnitudes are the variables "z0" and "z1" at the outputs of the first and the second detectors 606 and 608 respectively.

(ii) The variables "w0" and "w1" are computed as the difference of the current values of "z0" and "z1" and their p-bit delayed versions (e.g., p=½ which corresponds to a 25 ms delay). The buffers 610 are used to hold the "z0" and "z1" values over this interval for this purpose, essentially creating the delayed signal. Specifically, the output from the detector 606 and the output from the buffer 610 are differenced by the first difference means 612 to form the value "w0". This process essentially transforms the output from the detector 606, since if x(n) is the output of the detector 606 and x(n−k) is the output from the delay operator, then the output w0=x(n)−x(n−k) which in the Fourier Transform domain can be expressed as $W0(e^{j\omega})=X(e^{j\omega})(1-e^{jk\omega})$. Similarly, the output from the detector 608 and the output from the buffer 612 are differenced by the second difference means 614 to form the value "w1".

(iii) The output from the first and second difference means 612 and 614, respectively, are applied to a difference operator 616 to form the signal, w0−w1. The output, w0−w1, from the difference operator is applied to an absolute value computation means, 618, to form the absolute difference |w0−w1|. This absolute difference is then inputted to a circular buffer (i.e., the integrator or summer or buffer) 620 whose length is equal to that of the entire message duration.

(iv) A score 622 is computed as the sum of the past values of |w0−w1| over the message duration where only one sample is considered during each bit interval. Therefore, the number of terms in the sum is equal to the number of encoded bits. The buffer or latch 624 is used to hold the values over this interval.

(v) The function of the bit detector 640 is to identify a bit in the data as a "1" if w0>w1; or a "0", if otherwise.

(vi) The newly detected bit is shifted into a detected word by means of a shift register 642. The number of held words is equal to the number of processing intervals per bit period (40 for the example parameters).

(vii) If the current score exceeds the current best score (as identified by the peak detector 626), then the best score is set equal to the current score, the current detected word is held in the latch 624, and a timer 628 is reset.

(viii) The timer 628 is then decremented. When it reaches zero, a detection decision mode is entered.

(ix) The first step in decision mode is to apply the error correction by means of the error correction system 646 which would entail comparing each group of 6 interleaved bits to the table presented above and determining if there is a single error in the corrected 3-bit data sequence; or, flagging an uncorrectable group if there is more than 1 difference with each element of the table.

(x) If the corrected message has a sequence of "00" or "11" for the two lowest bits, then the message is regarded as noise and is used in the threshold setting. Otherwise, the best score is compared to the threshold and if the threshold is exceeded and the error correction was successfully applied, then the message is reported.

5. Threshold Setting:

The threshold logic is applied when a peak score has an incorrect check bit. An initial threshold is one of the values in the parameter file. A parameter $\alpha$ is hard coded and, in one aspect, has a value of 0.9. The threshold sum, S, is updated as: S=$\alpha$S+(best score); and the threshold is dynamically adjusted as:

$$\text{threshold} = S\left(\frac{1-r}{1-\alpha}\right).$$

The parameter r is initialized as "0" for a nonzero threshold, and is initialized to "1" if a threshold value is provided a priori. The value of r is multiplied by $\alpha$ at each threshold update time. The limiting behavior is the same whether or not an initial threshold value is supplied.

6. Single Frequency Bit Recovery:

In this way, the use of two frequencies may serve two purposes. One is to provide protection against the loss of one frequency during transmission. In addition to this use of the two frequencies, detections may be made on each of the single frequencies as well as on the power difference in the two-frequencies, which was presented above. This single frequency detection is accomplished by the following logic, which is described in terms of the variable names shown in FIG. 7.

If w0>w1, and w0<0 or w1>0, then a single bit error is counted. These single bit errors are detected and are buffered and latched in parallel with the detected bits.

7. Further Details:

No message detections are considered for a time after acceptance of a message in order to allow the circular buffers to be initialized and to reduce the workload. A subsequent valid message cannot occur sooner than the length of a message. Messages are only accepted if the number of errors in the two-frequency detection is below a pre-defined threshold. Messages are only accepted if the number of disagreements between the two-frequency detections and the single-frequency detections is below the pre-defined threshold.

8. Addition of Second Set of Tones:

In some cases, one of the transmitted tones may be suppressed at the detector as a result of multi-path effects. Either of the two transmitted frequencies can be lost during transmission without resulting in loss of the detected message because both tones are used in each bit detection decision. Loss of one frequency will prohibit the use of single frequency bit detection as a means of filtering out false messages. If protection against this failure mode is necessary, then each single tone can be replaced by two tones. The section of the detector that is shown in the top panel of FIG. 7 is replaced by elements shown in FIG. 8. Four filters 302–308 may be incorporated in place of the original two, and any single tone can be completely suppressed without loss of the detectable message.

9. Interleaving of Bits:

Four frequencies (as described in sec. 8 above) are used to provide some protection against the loss of a single frequency. Thus, a second set of sound bursts, within the spaces of the first set of sound bursts, may be transmitted. Each pair of transmitted bits may be encoded in the four sound bursts as follows:

| bit pair | 1st burst (tone) | 2nd burst (tone) | 3rd burst (tone) | 4th burst (tone) |
| --- | --- | --- | --- | --- |
| 00 | frequency A | frequency C | frequency B | frequency D |
| 01 | frequency A | frequency D | frequency B | frequency C |
| 10 | frequency B | frequency C | frequency A | frequency D |
| 11 | frequency B | frequency D | frequency A | frequency C |

The detection algorithm for the interleaved bits operates separately on two sets of interleaved bits in parallel with the same algorithm that was presented in relation to FIG. 7. The detection score is based on both sets of bits, but otherwise detection is independent for the two sets.

Figure 9:
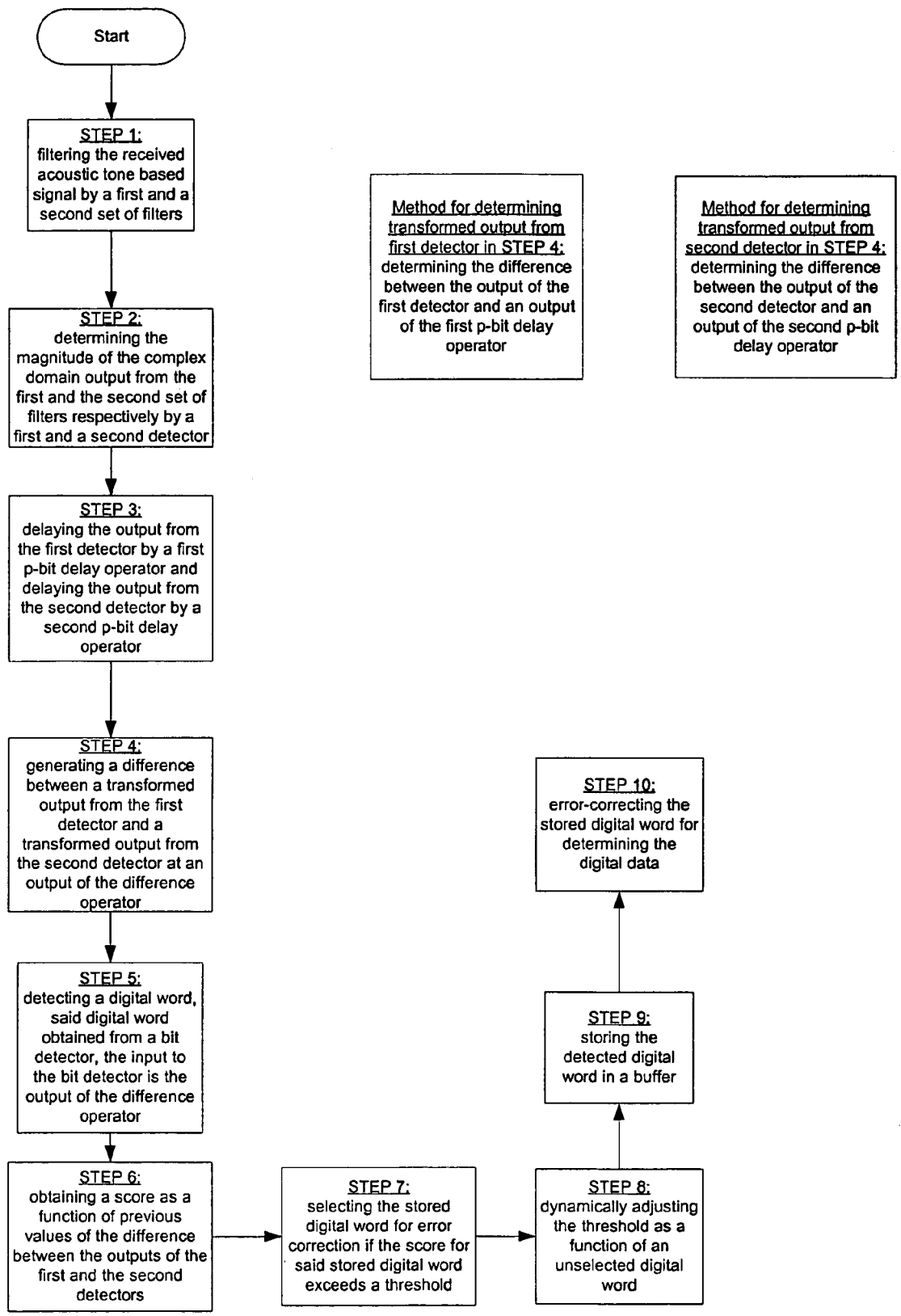
FIG. 9 is a flow chart depicting the method for data detection according to one aspect of the present invention.

FIG. 9 is a flow chart depicting the method for data detection according to the embodiment shown in FIG. 7.

While the specification describes particular embodiments of the present invention, those of ordinary skill can devise variations of the present invention without departing from the inventive concept. For example, the fundamental frequency of the tones, the harmonics, and the amplitudes of the fundamental and harmonics may be designed according to the application involved such as in Bluetooth based devices for vehicular, multimedia, and other environments. Also, the probability of bit error may be minimized by designing appropriate modulator (demodulator) systems based on a Quadrature Amplitude Modulator (QAM). The data encoding may be done using a Hamming, Hanning, or any other efficient source coding techniques.

I claim:

1. A digital data transmitting system using an acoustic tone, the system comprising:

a generator for generating digital data bits, said digital data bits including at least one check bit;

an error correction and interleaving system for adding at least one error correction bit to the digital data bits to form a data sequence;

an encoder for encoding each bit in the data sequence with a signal having the at least one acoustic tone to form an encoded sequence, the frequency of the at least one tone lying between 20 Hz and 20 kHz; and an audio speaker for transmitting the encoded sequence.

2. The digital data transmitting system according to claim 1, further including a modulator having a carrier signal as one of its input, said carrier signal being modulated by the encoded sequence.

3. The digital data transmitting system according to claim 1, wherein the number of digital data bits is the same as the number of error correction bits.

4. The digital data transmitting system according to claim 1, wherein the number of digital data bits is an integer multiple of P.

5. The digital data transmitting system according to claim 4, wherein P=3.

6. The digital data transmitting system according to claim 1, wherein each bit in the data sequence is encoded with a signal having two frequencies.

7. The digital data transmitting system according to claim 6, wherein the signal comprises a tone of a first frequency, followed by a first silence period, followed by a tone of a second frequency, and followed by a second silence period.

8. The digital data transmitting system according to claim 7, wherein the first frequency is substantially about 1600 Hz and the second frequency is substantially about 2800 Hz when the bit is a 0.

9. The digital data transmitting system according to claim 7, wherein the first frequency is substantially about 2800 Hz and the second frequency is substantially about 1600 Hz when the bit is a 1.

10. The digital data transmitting system according to claim 7, wherein the first and the second silence period is about 20 ms in duration.

11. The digital data transmitting system according to claim 1, wherein the data sequence 18 bits long.

12. The digital data transmitting system according to claim 2, wherein the modulator system is an amplitude modulator.

13. A method for transmitting digital data using acoustic tones, the method comprising:
generating digital data bits, said digital data bits including at least one check bit;
adding at least one error correction bit to the digital data bits to form a data sequence;
encoding each bit in the data sequence with a signal having at least one tone to form an encoded sequence, the frequency of the at least one tone lying between 20 Hz and 20 kHz; and
transmitting the encoded sequence by an audio speaker.

14. The method according to claim 13, further including the step of modulating a carrier signal by the encoded sequence by means of a modulator system.

15. The method according to claim 13, wherein the number of digital data bits is the same as the number of error correction bits.

16. The method according to claim 13, wherein each bit in the data sequence is encoded with a signal having two frequencies.

17. The method according to claim 16, wherein the signal comprises a tone of a first frequency, followed by a first silence period, followed by a tone of a second frequency, and followed by a second silence period.

18. The method according to claim 17, wherein the first frequency is substantially about 1600 Hz and the second frequency is substantially about 2800 Hz when the bit is a 0.

19. The method according to claim 17, wherein the first frequency is substantially about 2800 Hz and the second frequency is substantially about 1600 Hz when the bit is a 1.

20. The method according to claim 17, wherein the first and the second silence period is about 20 ms in duration.

21. The method according to claim 13, wherein the data sequence 18 bits long.

22. The method according to claim 14, wherein the modulator system is an amplitude modulator.

23. A receiver for detecting digital data in an acoustic tone based signal, the receiver comprising:
a first and a second set of filters for filtering the received acoustic tone based signal;
a first and a second detector for determining the magnitude of the complex domain output from the first and the second set of filters respectively;
a difference operator for generating a difference between a transformed output from the first detector and a transformed output from the second detector at an output of said difference operator;
means for detecting a digital word, said digital word obtained from a bit detector, wherein the input to the bit detector is the output of said difference operator;
a buffer for storing the detected digital word; and
means for error correcting the stored digital word for determining the digital data.

24. The receiver according to claim 23, wherein the first set of filters includes an in-phase filter and a quadrature filter.

25. The receiver according to claim 23, wherein the second set of filters includes an in-phase filter and a quadrature filter.

26. The receiver according to claim 23, further including a first and a second p-bit delay operators, the first p-bit delay operator delaying the output from the first detector and the second p-bit delay operator delaying the output from the second detector.

27. The receiver according to claim 26, wherein p=½.

28. The receiver according to claim 26, further including a first and a second difference means for transforming the outputs from the first and the second detectors.

29. The receiver according to claim 28, wherein the first difference means determines the difference between the output of the first detector and an output of the first p-bit delay operator.

30. The receiver according to claim 28, wherein the second difference means determines the difference between the output of the second detector and an output of the second p-bit delay operator.

31. The receiver according to claim 23, further including means for determining a score as a function of previous values of the difference between the outputs of the first and the second detectors.

32. The receiver according to claim 31, wherein the stored digital word is selected for error correction if the score for said stored digital word exceeds a threshold.

33. The receiver according to claim 31, wherein the score is a sum of the previous values of the difference between the outputs of the first and the second detectors.

34. The receiver according to claim 32, further including means for dynamically adjusting the threshold as a function of an unselected digital word.

35. A method for detecting digital data in an acoustic tone based signal, the method comprising:
filtering the received acoustic tone based signal by a first and a second set of filters;
determining the magnitude of the complex domain output from the first and the second set of filters respectively by a first and a second detector;

generating a difference between a transformed output from the first detector and a transformed output from the second detector at an output of said difference operator;

detecting a digital word, said digital word obtained from a bit detector, wherein the input to the bit detector is the output of the difference operator;

storing the detected digital word in a buffer; and error-correcting the stored digital word for determining the digital data.

36. The method according to claim 35, wherein the first set of filters includes an in-phase filter and a quadrature filter.

37. The method according to claim 35, wherein the second set of filters includes an in-phase filter and a quadrature filter.

38. The method according to claim 35, further including the step of delaying the output from the first detector by a first p-bit delay operator and delaying the output from the second detector by a second p-bit delay operator.

39. The method according to claim 38, wherein $p=\frac{1}{2}$.

40. The method according to claim 38, further including the step of determining the difference between the output of the first detector and an output of the first p-bit delay operator.

41. The method according to claim 38, further including the step of determining the difference between the output of the second detector and an output of the second p-bit delay operator.

42. The method according to claim 35, further including the step of obtaining a score as a function of previous values of the difference between the outputs of the first and the second detectors.

43. The method according to claim 42, further including the step of selecting the stored digital word for error correction if the score for said stored digital word exceeds a threshold.

44. The method according to claim 42, wherein the score is a sum of the previous values of the difference between the outputs of the first and the second detectors.

45. The method according to claim 43, further including the step of dynamically adjusting the threshold as a function of an unselected digital word.

46. A device for transmitting and receiving digital data wirelessly, the device comprising:

a transmitter including: (i) an error correction and interleaving system for introducing correction bits into the digital data to form a data sequence; (ii) an encoder for encoding the data sequence with acoustic tones to generate an encoded data sequence; (ii) an audio speaker for transmitting the encoded data sequence; and a receiver including: (i) a microphone for capturing the encoded data sequence; (ii) a first and a second set of filters for filtering the received acoustic tones encoded by the digital data; (iii) a first and a second detector for determining the magnitude of the complex output from the first and the second set of filters respectively; (iv) a difference operator for generating a difference between the outputs of the first and the second detectors; (v) means for detecting a digital word, said digital word obtained from a bit detector, wherein the input to the bit detector is the difference between the outputs of the first and the second detectors; (vi) a buffer for storing the detected digital word; (vii) means for error correcting the stored digital word for determining the digital data.

* * * * *